US007450547B2

(12) United States Patent
Kim et al.

(10) Patent No.: US 7,450,547 B2
(45) Date of Patent: Nov. 11, 2008

(54) METHOD FOR RESUMING HEADER DECOMPRESSION IN A MULTIMEDIA BROADCAST/MULTICAST SERVICE SYSTEM

(75) Inventors: Soeng-Hun Kim, Suwon-si (KR); Kook-Heui Lee, Yongin-si (KR); Sung-Ho Choi, Suwon-si (KR); Gert Jan Van Lieshout, Apeldoorn (NL)

(73) Assignee: Samsung Electronics Co., Ltd (KR)

( * ) Notice: Subject to any disclaimer, the term of this patent is extended or adjusted under 35 U.S.C. 154(b) by 791 days.

(21) Appl. No.: 11/063,348

(22) Filed: Feb. 14, 2005

(65) Prior Publication Data

US 2005/0201366 A1  Sep. 15, 2005

(30) Foreign Application Priority Data

Feb. 12, 2004 (KR) .................. 10-2004-0009392
Aug. 10, 2004 (KR) .................. 10-2004-0062971

(51) Int. Cl.
*H04Q 7/00* (2006.01)

(52) U.S. Cl. .................. 370/331; 370/343; 370/347; 370/349; 455/436; 309/247

(58) Field of Classification Search .................. 370/321, 370/331, 341–343, 347, 349, 389, 392, 477; 455/436, 502, 525; 709/247
See application file for complete search history.

(56) References Cited

U.S. PATENT DOCUMENTS 7,095,745 B2 * 8/2006 Tomizawa .................. 370/397

(Continued)

FOREIGN PATENT DOCUMENTS

EP 1337124 8/2003

(Continued)

OTHER PUBLICATIONS

3rd Generation Partnership Project; Technical Specification Group Radio Access Network; Packet Data Convergence Protocol (PDCP) Specification (Release 6), Dec. 2003.

(Continued)

*Primary Examiner*—Edward Urban
*Assistant Examiner*—Nhan T. Le
(74) *Attorney, Agent, or Firm*—The Farrell Law Firm, PC

(57) ABSTRACT

Disclosed is a method for resuming header decompression by receiving multimedia broadcast/multicast service (MBMS) packet data having compressed headers in a mobile communication system providing the MBMS. The method includes the steps of detecting a moving of user equipment (UE) receiving the MBMS into a new cell from an old cell, copying and storing old header decompression context information used in the old cell, initializing a dynamic part to decompress headers of packet data for the MBMS and waiting for an IR-DYN packet until the IR-DYN packet has been received in the UE, in order to update the old header decompression information, creating a new header decompression context through updating the old header decompression information by using the IR-DYN packet when the IR-DYN packet has been received in the UE, and decompressing the headers of the packet data for the MBMS transmitted from the new cell by using the new header decompression context.

14 Claims, 10 Drawing Sheets

U.S. PATENT DOCUMENTS

| | | | |
|---|---|---|---|
| 2002/0064190 A1* | 5/2002 | Sikora et al. | 370/537 |
| 2002/0091860 A1* | 7/2002 | Kalliokulju et al. | 709/247 |
| 2003/0078044 A1* | 4/2003 | Leung | 455/436 |
| 2003/0156559 A1* | 8/2003 | Yi et al. | 370/331 |
| 2004/0100913 A1* | 5/2004 | Kalliokulju et al. | 370/252 |
| 2004/0127258 A1* | 7/2004 | Taketsugu | 455/560 |
| 2005/0165945 A1* | 7/2005 | Lee et al. | 709/232 |

FOREIGN PATENT DOCUMENTS

| | | |
|---|---|---|
| JP | 2003-229870 | 8/2003 |
| WO | WO 02/11397 | 2/2002 |

OTHER PUBLICATIONS

Digital Cellular Telecommunications System (Phase 2+); Universal Mobile Telecommunications System (UMTS); Multimedia Broadcast/Multicast Service (MBMS); Utran/Geran Requirements, ETSI Standards, Sep. 2003.

Universal Mobile Telecommunications System (UMTS); Packet Data Convergence Protocol (PDCP) Specifications, ETSI Standards, Dec. 2003.

* cited by examiner

| Information Element/Group name | Need | Type and reference | Pre-configuration value |
|---|---|---|---|
| PDCP PDU header | MD | Enumerated (present, absent) | absent |
| Header compression information | OP | | Only ROHC is considered |
| >>RFC 3095 | | | |
| >>>Downlink | OP | | |
| >>>>CID inclusion info | MP | Enumerated (PDCP header, RFC3095 packet format) | RFC 3095 packet format |
| >>>>Max_CID | MD | Integer (1..16383) | 15 |
| >>>>Reverse_Decompression_Dep | MD | Integer (1..65535) | 0 |

802 — PDCP PDU header
804 — Header compression information
806 — >>>>CID inclusion info
808 — >>>>Max_CID
810 — >>>>Reverse_Decompression_Dep

FIG.8

METHOD FOR RESUMING HEADER DECOMPRESSION IN A MULTIMEDIA BROADCAST/MULTICAST SERVICE SYSTEM

PRIORITY

This application claims priority to an application entitled "Method For Resuming Header Decompression In Multimedia Broadcast/Multicast Service System" filed with the Korean Intellectual Property Office on Feb. 12, 2004 and Aug. 10, 2004 and assigned Serial Nos. 2004-9392 and 2004-62971, respectively, the contents of which are incorporated herein by reference.

BACKGROUND OF THE INVENTION

1. Field of the Invention

The present invention relates to a mobile communication system capable of providing a multimedia broadcast/multicast service (MBMS). More particularly, the present invention relates to a method for resuming header decompression in packet data with compressed headers.

2. Description of the Related Art

UMTS (Universal Mobile Telecommunication Service) is typically based on GSM (Global System for Mobile communication) and GPRS (General Packet Radio Services) standards. In contrast to the GMS which uses TDMA (Time Division Multiple Access), the UMTS employs a wideband CDMA technology and provides packet-based text, digital voice or video signals, and multimedia data at a high speed, above 2 Mbps regardless of location. The UMTS employs a switched virtual connection, called a "packet switching system" using a packet protocol, such as an Internet Protocol (IP). It is possible to access the UMTS from any end location in a network.

In general, since radio transmission resources are limited, it is inefficient to transmit data at high speeds to various user equipment. For instance, to provide one user equipment with a video streaming service of 64 kbps, radio transmission resources capable of transmitting data of 64 kbps is needed after forming a dedicated channel for the user equipment. If there are n user equipments, the amount of radio transmission resources needed increases by n times.

Alternatively, service can be provided to plural user equipments through a common channel. In this case, the same service can be provided to the user equipments through the common channel by using the same radio resources regardless of n if the user equipments are located in the same cell, so radio resources can be used effectively. The MBMS has been developed based on this point of view. That is, the MBMS has been developed in order to effectively transmit the same data to a plurality of user equipments in the UMTS. The MBMS is efficient and effective when transmitting multimedia data which requires a great amount of radio transmission resources.

To provide a packet-based multimedia service, a real time transport protocol (RTP), a user datagram protocol (UDP) and an Internet protocol (IP) are typically used. When using a combination of the above protocols, a header size of one packet may exceed 60 bytes, so it is necessary to compress the header to reduce consumption of the radio transmission resources. In the MBMS, a robust header compression (ROHC) scheme is used for compressing the header. Compression and decompression of the header is managed by a packet data control protocol (PDCP) entity, which manages the protocol of a PDCP layer. In a particular system, the PDCP entity is provided in a radio network controller (RNC), which manages a plurality of cells.

As mentioned above, in the case of the MBMS, user equipment requesting the same MBMS can be located in a plurality of cells, requiring MBMS data to be transmitted to all the cells. The system may have a PDCP entity for each cell or a common PDCP entity for several cells. If the PDCP entity is changed because the user equipment moves between cells with mutually different PDCP entities, the user equipment reestablishes its connection with the new PDCP entity.

Reestablishing the PDCP entity connection usually requires a new header decompressor and header decompression context. To do so, header information required for header decompression is obtained. However, it is very inefficient if the user equipment waits for the header information. Thus, it is desirable to provide a technique allowing the user equipment to rapidly resume header decompression without performing an initialization. When the PDCP entity connection needs to be reestablished from movement between cells.

SUMMARY OF THE INVENTION

Accordingly, the present invention has been made to solve the above-mentioned problems occurring in the prior art, so the present invention provides a method of reusing a context of an old PDCP entity when it is necessary to reestablish a header decompressor of a PDCP entity due to the movement of a user equipment between cells in an MBMS system.

The present invention also provides a method of reusing a context of an old PDCP entity when it is necessary to reestablish a header decompressor of a PDCP entity because a user equipment switches a channel type an MBMS system.

The present invention also provides a method of rapidly resuming header decompression without performing an initializing process by reestablishing a PDCP entity through reusing predetermined parts of a context of an old PDCP entity before a new cell and a new radio bearer have been established in an MBMS system.

The present invention also provides a method of forming the substantially same header compressor in a plurality of cells by using pre-configuration information in order to minimize operation of a user equipment required for reestablishing a PDCP entity in an MBMS system.

The present invention also provides a method of minimizing operation of a user equipment required for reestablishing a PDCP entity in an MBMS system by assigning context identifiers to header compression contexts according to a predetermined rule.

The present invention also provides a method capable of effectively using radio resources and ensuring continuous reception of services in a user equipment by effectively initializing a header decompressor when the user equipment receiving an MBMS resets a radio bearer.

According to one aspect of the present invention, there is provided a method of resuming a header decompression operation by means of a user equipment (UE) in a communication system capable of providing a multimedia broadcast/multicast service (MBMS), the method including: moving the UE receiving the MBMS into a new cell from an old cell; copying and storing old header decompression context information used in the old cell; initializing a dynamic part to decompress headers of packet data for the MBMS and waiting for an IR-DYN (Initialization and Refresh Dynamic) packet until the IR-DYN packet has been received in the UE, in order to update the old header decompression information; creating a new header decompression context through updating the old header decompression information by using the IR-DYN packet when the IR-DYN packet has been received in the UE; and decompressing the headers of the packet data for the MBMS transmitted from the new cell by using the new header decompression context.

According to another aspect of the present invention, there is provided a method of resuming a header decompression operation by means of a user equipment (UE) in a communication system capable of providing a multimedia broadcast/multicast service (MBMS), the method including: preparing a plurality of header compressors and a plurality of header compression contexts, which are substantially identical to each other, in a plurality of cells according to pre-configuration information used for the MBMS; moving the UE receiving the MBMS into a new cell from an old cell; establishing a new header decompressor for decompressing packet data having compressed headers transmitted from the new cell; copying and storing old header decompression context information, which is used in the old cell and includes a context ID, a static part, a dynamic part and operating parameters; setting values of the operating parameters of the old header decompression context information with predetermined values; initializing the dynamic part to decompress headers of packet data for the MBMS and waiting for an IR-DYN packet until the IR-DYN packet has been received in the UE, in order to update the old header decompression information; creating a new header decompression context through updating the old header decompression information by using the IR-DYN packet when the IR-DYN packet has been received in the UE; and decompressing the headers of the packet data for the MBMS transmitted from the new cell by using the new header decompression context.

BRIEF DESCRIPTION OF THE DRAWINGS

The above and other objects, features and advantages of the present invention will be more apparent from the following detailed description taken in conjunction with the accompanying drawings, in which:

FIG. 8 is a view illustrating configuration information of a predetermined PDCP according to an alternative embodiment of the present invention;

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention rather unclear. In addition, terms used in the following detailed description are defined by taking functions of elements used in the present invention into consideration, and the terms may vary depending on users, intentions of operators or practices thereof. Thus, definitions of the terms used in the following description may be determined based on the context of the present invention.

The present invention suggests a method of rapidly resuming header decompression in a new cell of a mobile communication system with MBMS, in which a header decompressor and a header decompression context are reestablished for the new cell by means of a user equipment moving between cells. The cells have mutually different header decompressors and header decompression contexts, and the reestablished header decompression context is updated by using an old header decompression context, thereby rapidly resuming header decompression.

First, the MBMS used for the present invention will be described.

Figure 1:
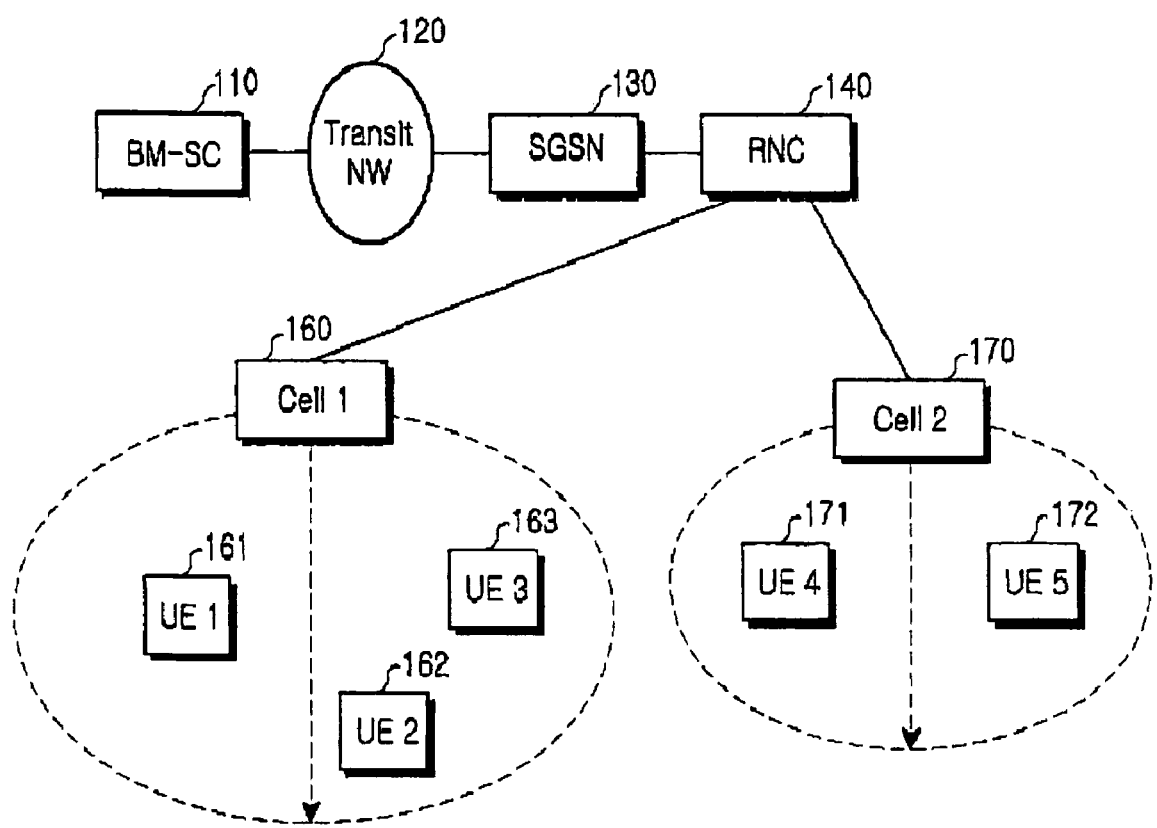
FIG. 1 is a view illustrating a schematic structure of a mobile communication system for an MBMS according to an embodiment of the present invention.

FIG. 1 is a view illustrating a schematic structure of a mobile communication system capable of providing the MBMS. Herein, the MBMS is applied to a 3GPP ($3^{rd}$ Generation Project Partnership) system, which is the standard for a $3^{rd}$ asynchronous mobile communication scheme.

Referring to FIG. 1, user equipments (UEs) 161, 162, 163, 171 and 172 represent terminals or subscribers for receiving the MBMS, and first and second cells 160 and 170 represent base stations capable of transmitting data related to MBMS to the UEs. As shown in FIG. 1, only one radio channel is formed between the first cell 160 and the UEs 161, 162 and 163 to provide the MBMS. An RNC 140 is a radio network controller for controlling a plurality of cells. The RNC 140 controls radio channels used for selectively transmitting multimedia data to a specific cell and for providing the MBMS to the UEs.

A serving GPRS supporting node (SGSN) 130 controls services of subscribers related to the MBMS. For instance, the SGSN 130 may manage data related to the service charge of each subscriber and selectively transmit multimedia data to a specific RNC. A transit network 120 provides a communication path between a broadcast/multicast service center (BM-SC) 110 and the SGSN 130 and includes a gateway GPRS support node (GGSN) and an external network. The BM-SC 110 is a source for MBMS data and manages scheduling of data for each service.

An MBMS data stream is transferred to the UEs 161, 162, 163, 171 and 172 through the transit network 120, the SGSN 130, the RNC 140 and cells 160 and 170. Although they are not shown, a plurality of RNCs can be provided for plural SGSNs or for each SGSN and MBMS service. The SGSN selectively transmits data to the RNC and the RNC selectively transmits data to the cells. To this end, the SGSN and the RNC store lists for transmitting the data stream. That is, the SGSN stores the list of the RNCs and the RNC stores the list of the cells therein in order to selectively transmit MBMS data to the RNCs and the cells.

Figure 2:
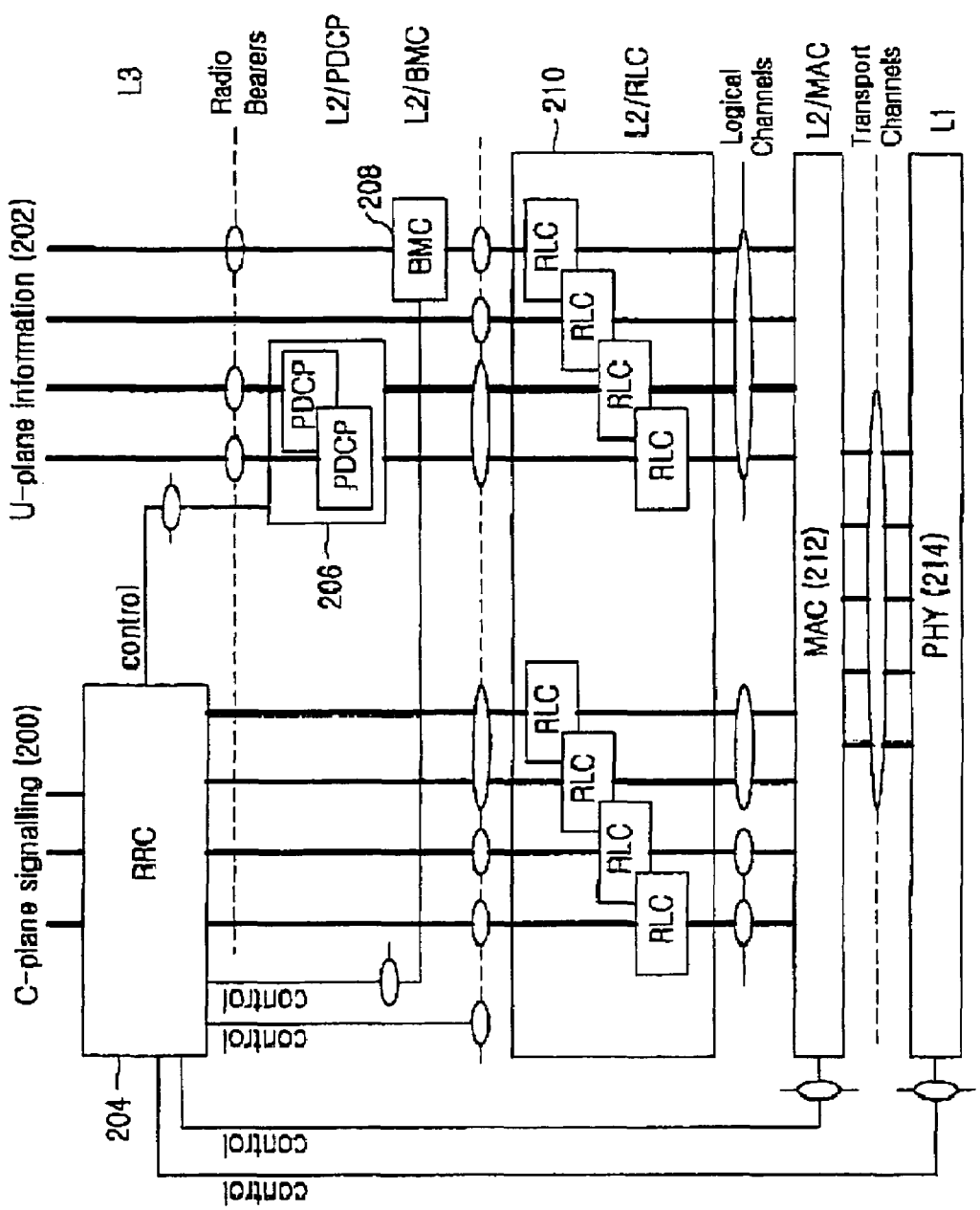
FIG. 2 is a view illustrating a layered structure of an interface for transmitting data and signaling messages between a user equipment and an RNC according to an embodiment of the present invention.

FIG. 2 is a view illustrating a layered structure of a user interface for transmitting data and signaling messages between the user equipment and the RNC. Herein, the layered structure of the user interface is divided into a control plane (C-plane) used for switching a control signal between the UE and the RNC and a user plane (U-plane) used for transmitting data.

Referring to FIG. 2, a C-plane signaling 200 is processed through a radio resource control ("RRC") entity 204, a radio link control ("RLC") entity 210, a media access control ("MAC") entity 212, and a physical ("PHY") entity 214. In addition, U-plane information 202 is processed through a packet data control protocol ("PDCP") entity 206, a broadcast/multicast control ("BMC") entity 208, the RLC entity 210, the MAC entity 212 and the PHY entity 214. In general, the PHY entity 214 is located in each cell, and remaining entities from the MAC entity 212 to the RRC entity 204 are located in the RNC.

The PHY entity 214 provides an information transmit service by using a radio transfer technique. The PHY entity 214 is a first layer of an open systems interconnection model (OSI). The PHY entity 214 is connected to the MAC entity 212 through transport channels aligned therebetween. The transport channel is defined based on a processing scheme for specific data at a physical layer.

The MAC entity 212 is connected to the RLC entity 210 through logical channels. The MAC entity 212 transfers data from the RLC entity 210, through the logical channel, to the physical layer through a predetermined transport channel, and transfers data from the PHY entity 214, through the transport channel, to the RLC entity 210 through a predetermined logical channel. In addition, the MAC entity 212 inserts additional information to data transmitted through the logical or transport channel, performs a proper action by analyzing the additional information, and controls random access operation.

The RLC entity 210 sets or releases the logical channels. The RLC entity 210 can be operated in an acknowledged mode (AM), an unacknowledged mode (UM) and a transparent mode (TM). providing different functions in each mode. In general, the RLC entity 210 may divide the service data unit (SDU) of an upper layer into several units having predetermined sizes, or combine the divided units. In addition, the RLC entity 210 may correct errors through an automatic repeat request (ARQ).

The PDCP entity 206 is located on a layer in the U-plane that is higher than the RLC entity 210. The PDCP entity 206 compresses or decompresses IP packet data headers or transfers data without loss when the RNC is switched movement of the UE. For general service, the PDCP entity 206 has a lossless SRNS (serving RNS) relocation support function and a header compression function. However, with MBMS, it is not necessary to provide the lossless SRNS relocation support function because of the characteristics of the broadcast/multicasting.

Herein, the SRNS relocation refers to UE movement into a cell controlled by an RNC other than the SRNC and, resets the new RNC as the new SRNC.

The BMC entity 208 is located in a class above the RLC entity 210 to support a broadcasting service of the same data to a plurality of UEs from a specific cell.

When calls for a specific service are set, the RNC establishes entities for processing protocols of PDCP/RLC/MAC/PHY layers. Herein, a set of protocol entities used for providing the specific service is called a "radio bearer (RB)". The entities can be formed by a hardware device, a software-executing block, or a combination of hardware and software.

Forming the protocol entities indicates that operating parameters have been provided to the hardware device or software block forming the entities. An access position between the protocol entities is called a "service access point (SAP)". For instance, a contact point between the PDCP entity and the RLC entity is called an "RLC SAP". Primitives, such as RLC-DATA-REQ, which is user data transmitted to the RLC entity from the PDCP entity, are transferred through the RLC SAP.

The RRC entity 204 controls allocation or release of radio resources between an UTRAN and the UE. The RRC entity 204 manages radio resources allocated to the UEs and their mobility. In addition, when there are core network signals to be transferred to the UEs, the RRC entity 204 transfers the core network signals to corresponding UEs.

To provide UEs with service, the context, which is a set of information for providing the services, is created between UEs and network nodes (RNC, SGSN, etc). The context includes a UE context and a mobility management (MM) context. For example, if the UEs want to receive the MBMS, the MBMS context is provided for the network nodes. The MBMS may allow a plurality of UEs to receive the same information simultaneously, so the MBMS service context is not created for each UE, but created for each MBMS or each session in the service. The same header compression/decompression contexts are provided between the RNC and the UE for the PDCP entity performing compression and decompression of the header. The header compression/de-compression contexts include all non-compressed header information of packet data related to the corresponding MBMS and are updated whenever packet data is transmitted or received.

Hereinafter, a header compression operation by means of the PDCP entity, in particular, a robust header compression (ROHC) operation used for the MBMS will be briefly described.

The MBMS data is provided in the form of RTP/UDP/IP packets. The RTP/UDP/IP header includes various information fields, such as protocol version, header length, service type, whole length, packet ID, time to live (TTL), protocol ID, header checksum for a CRC (Cyclic Redundancy Check), IP addresses of a source and a destination, and a UDP port number. The RTP/UDP/IP header has a size of about 60 bytes, which is too large to be transmitted through the radio channel.

The RTP/UDP/IP header has a predetermined tendency making it is possible to reduce the size of the RTP/UDP/IP header by a technique called "header compression".

For example, in the RTP/UDP/IP header, the IP address and the UDP port number are unchanged while the MBMS is provided. The IP address and the UDP port number are transmitted several times only at the start of MBMS transmissions. Such header fields are called "static header fields". The static header fields are stored in a static part of the context related to the MBMS. In addition, some fields, such as a serial number (SN) field of the RTP, may vary in each packet. For example, the SN field of the RTP may be increased by 1 in each packet. Such header fields are called "dynamic fields". The dynamic fields are transferred to a receiver whenever the dynamic fields are changed and the changed values of the dynamic fields are stored in the dynamic part of the context.

The header compressor of the PDCP entity of the RNC compresses the headers received from the core network based on the header compression context and updates the header decompression context in each packet stream. The packet stream is defined as a set of packets having the same static header fields. For instance, one media component of one MBMS is defined as one packet stream. One header compressor can compresses a plurality of packet streams. In this case, a plurality of contexts are used. At this time, the contexts are identified by means of context identification (CID). In short, the header compression/decompression context includes the CID, the static part, and the dynamic part.

The context further includes operating parameters for header compression/decompression. The operating parameters include additional information, utilized when the header compression/decompression operations are performed on a specific packet stream. The operating parameters will be described later in detail.

Upon receiving the first packet data of a packet stream in the MBMS, the header compressor initializes the static part and the dynamic part of the MBMS context by using the header fields of the packet data. In addition, the header compressor determines the CID used for the packet stream and repeatedly transmits an initialization and refresh packet (IR packet) with all the information related to the CID, the static part, and the dynamic part to the header decompressor of the PDCP entity for the UE. The header decompressor receives the IR packets and initializes the context of the header decompressor for header decompression. That is, the header decompressor overlaps information from the static part and the dynamic part in the IR packets on the context.

After the header decompressor transmits a predetermined amount of IR packets sufficient for initializing the context, the header compressor transmits the packet data with compressed headers. At this time, if the ROHC scheme is employed, the packet data with the compressed headers are called "ROHC packets". When compressing the header, the dynamic header fields are transmitted only when values of the dynamic header fields are changed without transmitting the static header fields. The header decompressor adds static header fields, which are read from the static part of the context, to the received packet, decompresses values of the dynamic header fields, and updates the contexts by using the decompressed header field values. That is, the header compressor and the header decompressor operate based on the contexts. So, the contexts are updated in the same way so that the updated contexts in the header compressor and decompressor match.

If there is any context inconsistency between the header compressor and the header decompressor, the header decompressor may erroneously decompress the header, corrupting data. Context inconsistencies mainly occur in the dynamic part. To prevent an inconsistency, the ROHC may periodically transmit the IR packets with all information related to the static part and the dynamic part and with initialization and refresh dynamic (IR-DYN) packets including only information of the dynamic part. Although the period of the IR/IR-DYN packets is not defined in the ROHC standard disclosed in the RFC (request for communication) 3095, the periodic transmission period of the IR-DYN packet is generally shorter than the periodic transmission period of the IR packet.

When context synchronization is achieved between the header compressor and the header decompressor by the IR/IR-DYN packets, the header compressor transmits the packets with compressed headers (for example, ROHC packets) according to the context. The header decompressor then decompresses the compressed header by using the same context used for header compression. As described above, the dynamic and static parts of the contexts are periodically synchronized by the IR/RI-DYN packet.

When the UE moves into a new cell, if the new cell uses a different PDCP entity, the UE reestablishes the PDCP entity of the new cell. In addition, if the UE wants to switch channel type during communication, the UE can reestablish the PDCP entity. In this case, the initialization procedure allows the reestablished PDCP entity to continuously perform the MBMS.

The initialization procedure is a procedure performed by the header decompressor to receive the IR packet transmitted from the header compressor. However, since the transmission period of the IR packet is significantly larger than the transmission period of the IR-DYN packet, the UE, after moving into the new cell, may not receive the IR packet until after waiting a long time. As a result, header decompression is suspended until the IR packet is received.

As mentioned above, information in the context includes the CID, the static part and the dynamic part. Since the static part has the same value for the same packet stream, the static part of the context for the old cell can be used for the new cell. Therefore, according to the preferred embodiment of the present invention, the IR-DYN packet is used instead of the IR packet to update the dynamic part of the context for the new cell. Since the IR-DYN packet is more frequently transmitted than the IR packet, the UE can stably establish the context for the new cell within a relatively short period of time using the IR-DYN packet, instead of the IR packet.

Figure 3:
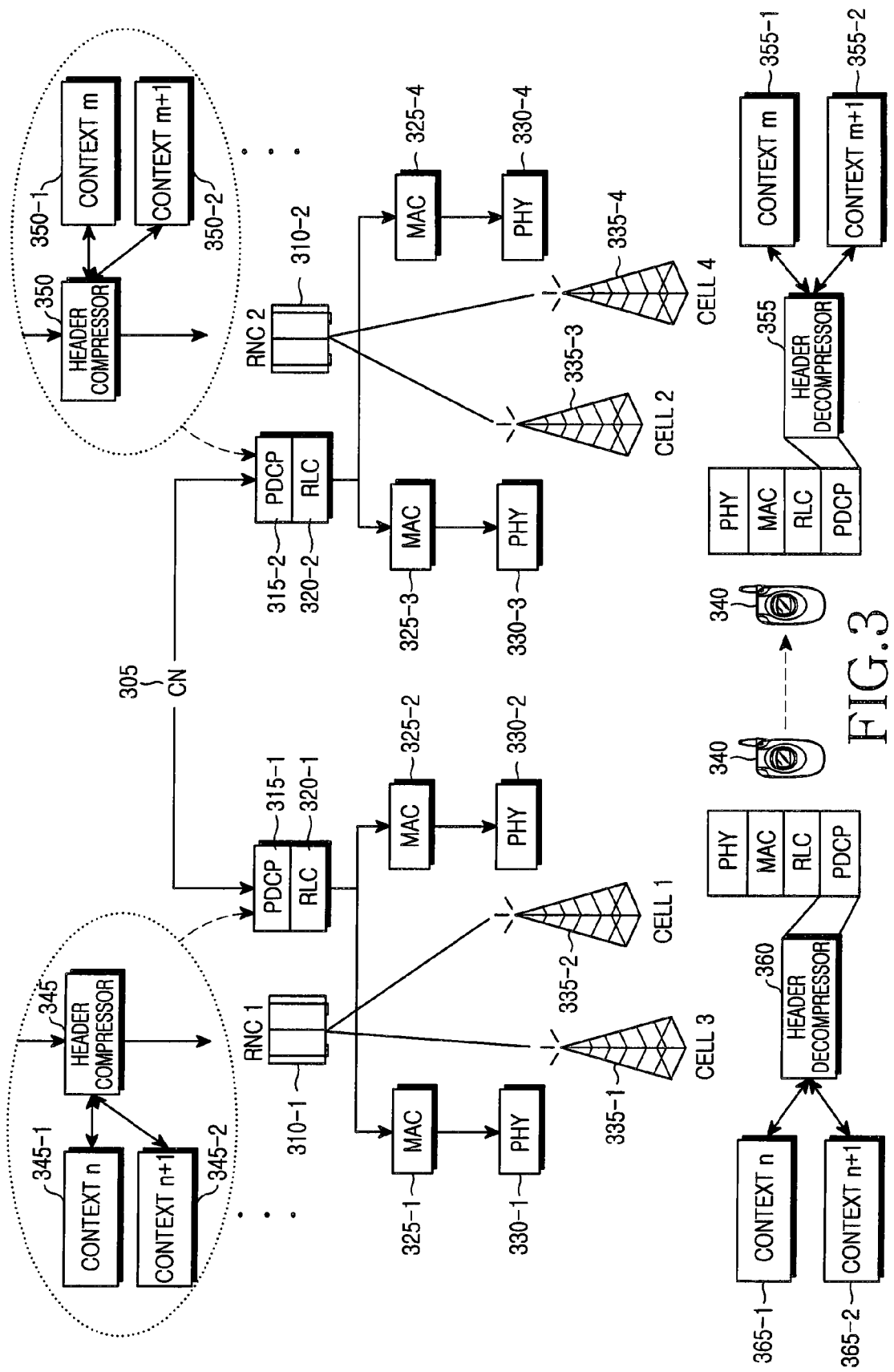
FIG. 3 is a view illustrating the movement of a user equipment, which receives an MBMS, between cells in an MBMS communication system according to an embodiment of the present invention.

FIG. 3 is a view illustrating a shift of the UE receiving the MBMS between cells in an MBMS communication system according to the preferred embodiment of the present invention. Herein, a first RNC 310-1 includes a first cell 335-2 and a third cell 335-1, a second RNC 310-2 includes a second cell 335-3 and a fourth cell 335-4, and a UE 340 receiving the MBMS in the first cell 335-2 is moved into the second cell 335-3 while continuously receiving the MBMS.

Referring to FIG. 3, a network providing the MBMS includes a core network (CN) 305, RNC entities 310-1 and 310-2, and plural cells 335-1, 335-2, 335-3, and 335-4. The RNC entities 310-1 and 310-2 convert data transmitted from the CN 305 to adapt the date for the radio channel and transmit the converted data to each cell. To this end, each of the RNC entities 310-1 and 310-2 includes PDCP entities 315-1 and 315-2, RLC entities 320-1 and 320-2, and MAC entities 325-1, 325-2, 325-3 and 325-4.

The RNC entities 310-1 and 310-2 divide the data of the upper layer into a predetermined size so such that the data can be transmitted through the radio channel, and inserts sequence numbers into the data. The RLC entities 320-1 and 320-2 shared by plural cells, or may be individually formed in each cell. According to the present invention, the RLC entities 320-1 and 320-2 are shared by plural cells. The MAC entities 325-1, 325-2, 325-3 and 325-4 insert IDs into the MAC layer headers of each packet to identify a particular service in one radio channel. Each of the MAC entities 325-1, 325-2, 325-3 and 325-4 is formed in each cell.

The PDCP entities 315-1 and 315-2 compress the packet data of the core network 305 according to a predetermined compression scheme and transfer the compressed packet data to the RLC entities 320-1 and 320-2. To this end, the PDCP entities 315-1 and 315-2 include header compressors 345 and 350, and header compression contexts 345-1, 345-2, 350-1 and 350-2 for storing information required for header compression, respectively.

The header compressors 345 and 350 transfer packets having compressed headers corresponding to each MBMS service, and header decompressors 355 and 360 decompress the compressed headers by using header decompression contexts 355-1, 355-2, 365-1 and 365-2. The dynamic parts and static parts of the above contexts 345-1, 345-2, 350-1, 350-2, 355-1, 355-2, 365-1 and 365-2 are periodically synchronized by means of the IR/IR-DYN packets.

The contexts for the packet streams processed in each header compressor 345 or 350 are distinguished from each other by CID. In FIG. 3, the CIDs assigned to the header compression contexts 345-1, 345-2, 350-1 and 350-2 are illustrated as n, n+1, m and m+1, respectively.

The first and third cells 335-2 and 335-1 located at a lower layer of the first RNC 310-1 share the same PDCP entity 315-1. In addition, the second and fourth cells 335-3 and 335-4 located at a lower layer of the second RNC 310-2 share the same PDCP entity 315-2. Hereinafter, the description will be made for an operation of the UE 340 to resume the MBMS when moving from the first cell 335-2 to the second cell 335-3.

To receive the MBMS in the first cell 335-2, the UE 340 uses the PHY entity, the MAC entity, the RLC entity and the PDCP entity. In the first cell 335-2, the header decompressor 360 of the UE 340 decompresses compressed header, by using the header decompression contexts 360-1 and 360-2. The header decompression contexts 360-1 and 360-2 are synchronized with the header compression contexts 345-1 and 345-2 of the header compressor 345.

If the UE 340 is moved into the second cell 335-3, the UE 340 reestablishes PHY/MAC/RLC/PDCP entities for processing the MBMS data transmitted from the second cell 335-3 because the second cell 335-3 has a different PDCP entity than that of the first cell 335-2. Thus, the UE 340 obtains system information, which is periodically broadcasted in the second cell 335-3, to establish the above entities. More specifically, to decompress the packet data with the compressed header the UE 340 establishes the header decompressor 355 and the header decompression contexts 355-1 and 355-2, and then receives the MBMS by using the header decompressor 355 and the header decompression contexts 355-1 and 355-2.

Figure 4:
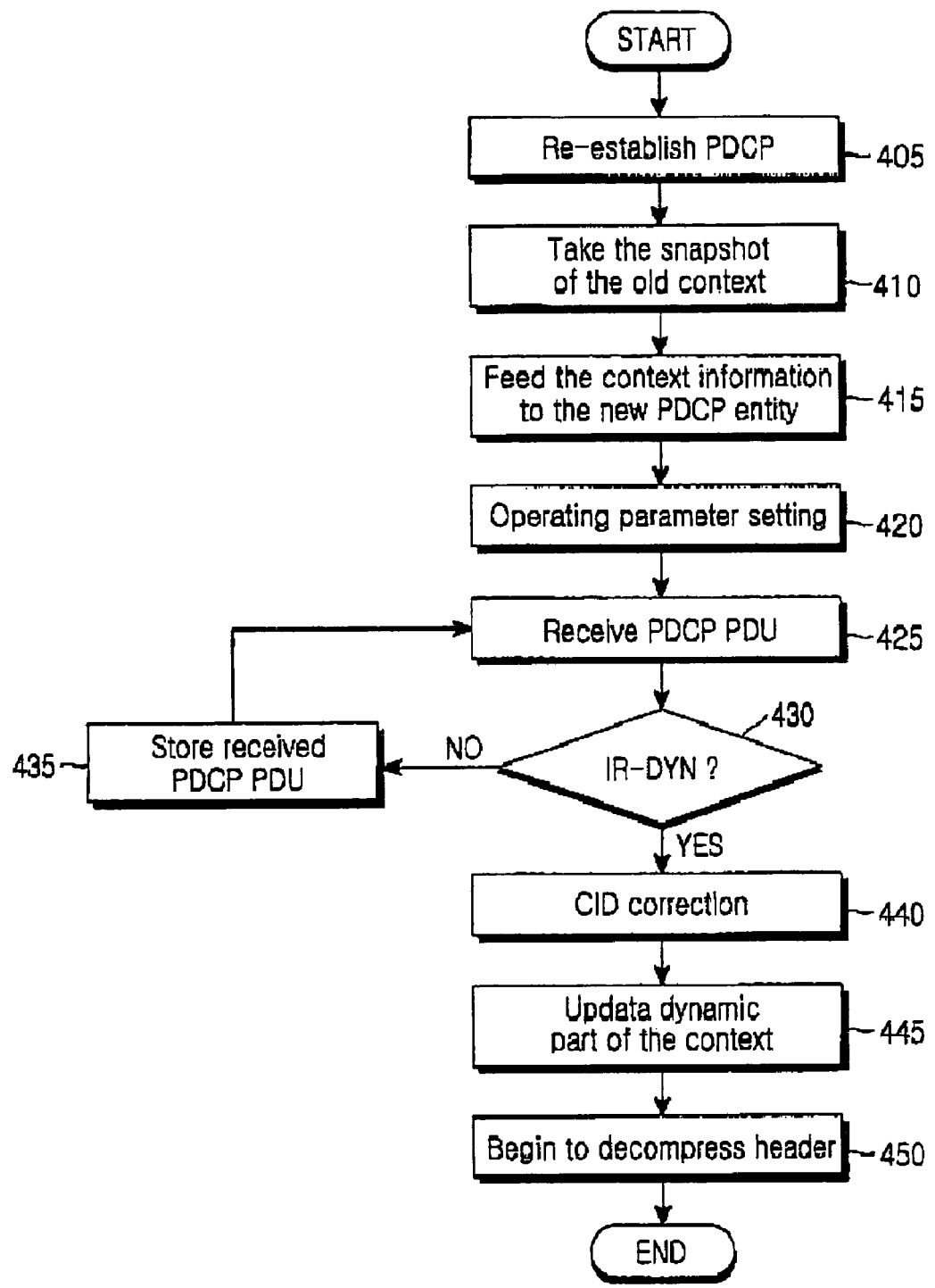
FIG. 4 is a flowchart illustrating a procedure of resuming an MBMS for a user equipment moved between cells according to an embodiment of the present invention.

FIG. 4 is a flowchart illustrating a procedure of resuming an MBMS for the UE moving between cells according to a preferred embodiment of the present invention.

Referring to FIG. 4, a UE may reestablish a PDCP entity by first determining if reestablishment of header compression is necessary (step 405). Herein, the UE can determine the reestablishment of header compression based on various factors. For instance, when the UE detects a different PDCP entity, or when the UE detects a switch in the channel type of the MBMS. A channel type switch is described below. Forward transmission output may be used excessively to provide the MBMS. In particular, MBMS service is provided to the UEs through the common channel, even if only a few UEs want to receive the MBMS, thereby wasting radio transmission resources. For this reason, when providing MBMS in the 3GPP, the number of UEs in the same cell receiving MBMS is considered.

In further detail, if the number of UEs receiving MBMS in a cell is less than a predetermined reference number, the MBMS service is provided to the UEs through dedicated channels for the UEs. If the number of the UEs receiving MBMS in a cell is more than the predetermined reference number of the UEs, the MBMS service is provided to the UEs through the common channel. Therefore, channel type can be switched from the common channel to the dedicated channel or vice versa according to the number of UEs receiving the MBMS in the same cell. The channel type of the UE can also be switched if the UE is moved into a different cell providing using a different channel type.

When the channel type is switched, all of protocol entities forming the radio bearer, such as PDCP/RLC/MAC/PHY entities, are reestablished.

In step 410, the UE takes a snapshot of the context used in the header decompressor of the old PDCP entity. The old PDCP entity is discarded when a header decompressor and context of a new PDCP are established.

In step 415, the UE reestablishes the PDCP entity and feeds the old context information to the new PDCP entity. In step 420, the UE sets the operating parameters with proper values. Step 420 will be described later in detail with reference to FIG. 7.

In step 425, the UE receives the packet data of the new PDCP entity of the new cell through the RCL layer. Since the above packet data is processed by the PDCP entity, the above packet data are called "packet datagram units" including a PDCP header and a PDCP payload. In step 430, the UE checks whether the received packet data are IR-DYN packets with the CID and the dynamic part required for head compression. If the received packet data are the IR-DYN packets, step 440 is performed. Otherwise, step 435 is performed.

In step 435, since the header decompression context with the new cell has not been yet established, the UE determines that header decompression cannot resume. Thus, the UE stores the received packet data to decompress later and returns to step 425. The UE can discard the received packet data if it determines that the data is not necessary. The receiving and storing (or discarding) operations are repeated until the IR-DYN packets are received. That is, the header decompression operation of the UE is suspended in step 430 until the IR-DYN packet has been received in the UE from the new cell.

In step 440, the UE corrects the CID of the old context information by using the IR-DYN packet because the CID of the old cell may be different from the CID of the new cell for the same MBMS. CID correction will be described later in detail with reference to FIGS. 5 and 6.

In step 445, the UE updates the dynamic part of the old context information by using the IR-DYN packet to establish the new context. In step 450, the UE begins header decompression by using the new PDCP entity and the new context. At this time, if the UE includes stored packet data with header that have not yet been decompressed, the UE may decompress the stored packet data headers by using the new context.

Hereinafter, the method for creating the new context by updating the old context information will be described in detail.

As described above, the MBMS includes a plurality of media, each of which consists of at least one packet stream. Such a multimedia service can be provided through a radio network according to the following three schemes.

In the first scheme, a plurality of PDCP entities are established for a plurality of media streams in such a manner that each PDCP entity can simultaneously process the RTP stream and the RTCP (real-time transport control protocol) stream. Herein, the RTP is a protocol for transmitting actual media, such as voice or videos, and the RTCP is an auxiliary protocol used for each RTP stream.

According to a second scheme, one PDCP entity is established for a plurality of media streams in such a manner that the PDCP entity can simultaneously process the RTP streams and the RTCP streams.

And in the third scheme, a plurality of PDCP entities are established for a plurality of media streams in such a manner that each PDCP entity processes only the RTP stream.

For example, if the MBMS includes voice and video media, according to the first scheme, the RNC establishes the PDCP entities of P1 and P2 for the voice and video media in such a manner that the RTCP stream related to the voice media stream is provided through P1 and the RTCP stream related to the video media stream is provided through P2.

According to the second scheme, the RNC establishes one PDCP entity in such a manner that the voice media stream, the RTCP stream related to the voice media stream, the video media stream, and the RTCP stream related to the video media stream is provided through the PDCP entity.

According to the third scheme, the RNC establishes the PDCP entities of P1 and P2 for the voice and video media in such a manner that the voice media stream is provided through P1 and the video media stream is provided through P2.

Since header compression and decompression is done for each stream, the above three schemes may relate to the number of contexts existing in one PDCP entity. That is, in the first scheme, one PDCP entity requires two contexts for the RTP stream and the RTCP stream. In the second scheme, one PDCP entity requires four contexts for two RTP streams and two RTCP streams. In the third scheme, one PDCP entity requires one context for one RTC stream.

If the PDCP entity includes only one context, as in the third scheme, CID correction can be achieved easily. In this case, the new PDCP entity simply replaces the CID of the old context information with the CID of the IR-DYN packet from the radio bearer of the new cell. However, if the PDCP entity includes at least two contexts, as in the first and second schemes, the CID correction may be more complex.

Figure 5:
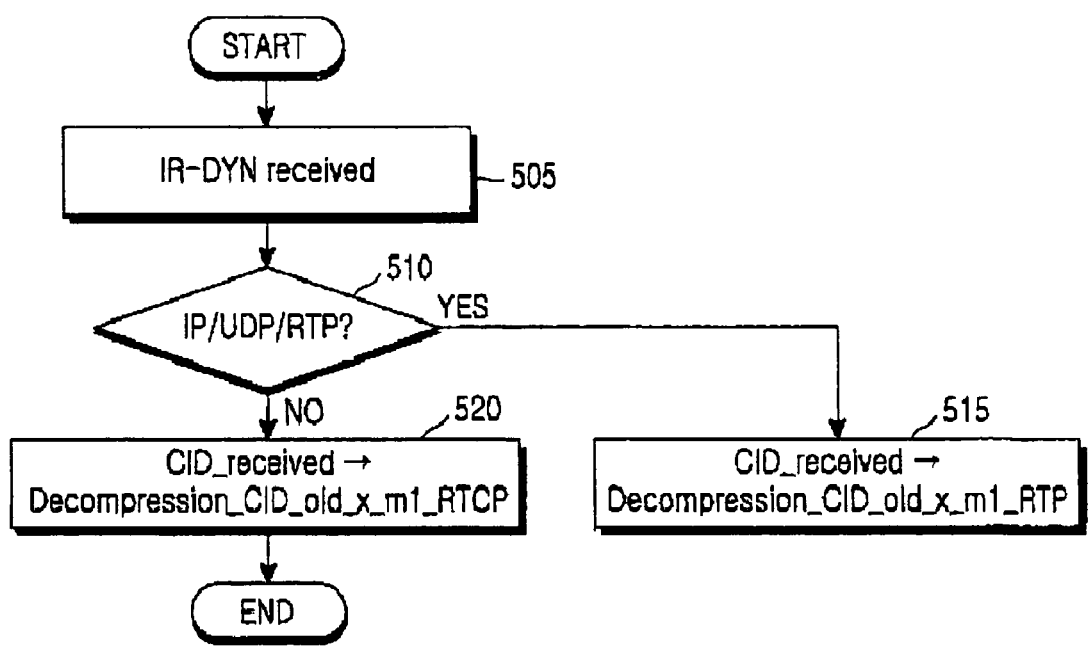
FIGS. 5 and 6 are flowcharts illustrating procedures of updating context identifiers according to an embodiment of the present invention.

FIG. 5 is a flowchart illustrating the procedure of CID correction when one PDCP entity processes the RTP media and the RTCP stream. FIG. 5 shows steps 430 and 440 shown in FIG. 4 in detail.

In this embodiment, the new PDCP entity is established to compress the media m1 of a specific MBMS x, and includes a contexts for decompressing the RTP and RTCP streams. Accordingly, the new PDCP entity receives information about two contexts of the old PDCP and divides the received contexts into an RTP stream context and an RTCP stream context.

Referring to FIG. 5, the UE receives the IR-DYN packet from the new cell (step 505). The IR-DYN packet includes a CID, a profile and a dynamic part. The profile represents the header compression scheme applied to the context, which is identified by the CID. For instance, a profile 0 represents that header compression is not applied to the context, a profile 1 represents the RTP/UDP/IP header compression, and a profile 2 represents the UDP/IP header compression.

The UE inspects whether the IR-DYN packet relates to the RTP or the RTCP by the profile value. Since the RTP stream is compressed with profile 1, the content of the IR-DYN packet with profile 1 are applied to the context for the RTP. In addition, since the RTCP packet is not compressed or is compressed with the UDP/IP compression scheme, the content of the IR-DYN packet having the profile 0 or the profile 2 is applied to the context for the RTCP.

In step 510, the UE inspects the profile of the IR-DYN packet. If the profile value is 0 or 2, it is determined that the IR-DYN packet relates to the RTCP stream so that step 520 is performed. If the profile value is 1, it is determined that the IR-DYN packet relates to the RTP stream and step 515 is performed. In step 515, the UE replaces the CID (Decompression_CID_old_x_m1_RTP) of the RTP context with the CID (CID_received) of the IR-DYN packet. In addition, as described above with reference to FIG. 4, the UE updates the dynamic part of the RTP context according to the IR-DYN packet. In step 520, the UE replaces the CID (Decompression_CID_old_x_m1_RTCP) of the RTCP context with the CID (CID_received) of the IR-DYN packet. In addition, as described above with reference to FIG. 4, the UE updates the dynamic part of the RTCP context according to the IR-DYN packet.

Hereinafter, the procedure shown in FIG. 5 will be described in detail.

A cell y1 provides the MBMS service x consisting of two media m1 and m2, and RTCP packets for the two media are intermittently generated. The m1 header consisting of the RTP media stream and the RTCP media stream is compressed through the PDCP entity P1, the CID of the first header compression context for the RTP media stream is set to 1, and the CID of the second header compression context for the RTCP media stream is set to 2. Profile 1 is applied to the first header compression context and the profile 2 is applied to the second header compression context.

The UE located in the cell y1 includes the PDCP entity of P1' for receiving the MBMS service x. The PDCP entity P1' includes first and second header decompression contexts in order to decompress the RTP media stream and the RTPC media stream with profile values of 1 and 2, respectively.

As the UE movs into the new cell y2, the UE establishes the new PDCP entity P2'. Accordingly, the UE transfers the first and second header decompression contexts used in the PDCP entity P1' to the new PDCP entity P2'. The new PDCP entity P2' recognizes the first header decompression context as the context for the RTP media stream and recognizes the second header decompression context as the context for the RTCP media stream.

For example, if the new PDCP entity P2' receives the IR-DYN packet [5] having the CID of 5, the UE inspects the profile of the IR-DYN packet. If the profile of the IR-DYN packet [5] is 1, the CID of the first header decompression context is corrected as 5, and the dynamic part of the first header decompression context is updated based on the IR-DYN packet [5].

In the cell y2, the first header decompression context is used for decompressing the headers of packets having the CID of 5. For example, if the UE receives the IR-DYN packet [10] having the CID of 10 and the profile of the IR-DYN packet [10] is 2, the UE sets the CID of the second header decompression context as 10 and updates the dynamic part of the second header decompression context based on the IR-DYN packet [10]. In the cell y2, the second header decompression context is used for decompressing the headers of packets having the CID of 10.

The above description has been made in relation to the first scheme, in which one PDCP entity processes one media stream. However, if one PDCP entity processes a plurality of media, each of which includes a plurality of media streams, as described above with reference to the second scheme, it is too difficult to discriminate the streams by using the profile information only.

For instance, the UE may include the RTP context (CID=x) for media m1, the RTP context (CID=y) for media m2, the RTCP context (CID=w) for media m1, and the RTCP context (CID=z) for media m2 in relation to the PDCP entity P1'. In this case, after establishing the new PDCP entity P2', the UE provides the contexts to the PDCP entity P2' and waits for the IR-DYN packet to update the CIDs of the contexts.

If the UE receives the IR-DYN packet [CID=a, profile=0 or 2], the IR-DYN packet [CID=b, profile=0 or 2], the IR-DYN packet [CID=c, profile=1] or the IR-DYN packet [CID=d, profile=1], the UE recognizes that the c and d are CIDs for RTP contexts and a and b are CIDs for RTCP contexts. However, the UE does not recognize the relationship between the CIDs c and d and the media m1 and m2 for the RTP contexts.

In addition, the UE does not recognize the relationship between the CIDs a and b and the media m1 and m2 for the RTCP contexts.

The IR-DYN packets have payload type (PT) fields representing the code used for coding the RTP payload. For example, PT 3 represents a GSM voice coding, PT 12 represents a Q-CELP (Qualcomm Code Excited Linear Predication) voice coding, and PT 34 represents H.263 video coding. Since the contexts used for decompressing headers of RTP protocol have PT values, the UE compares the PT value of the IR-DYN packet with the PT values of the contexts, thereby checking whether the contexts correspond to the IR-DYN packet.

For instance, if the PR value included in the RTP context of the media m1 is "e" and the PR value included in the RTP context of the media m2 is "f", the CID of the IR-DYN packet with the PT value of "e" becomes the CID of the RTP context and the CID of the IR-DYN packet having the PT value of "f" becomes the CID of the RTCP context.

Figure 6:
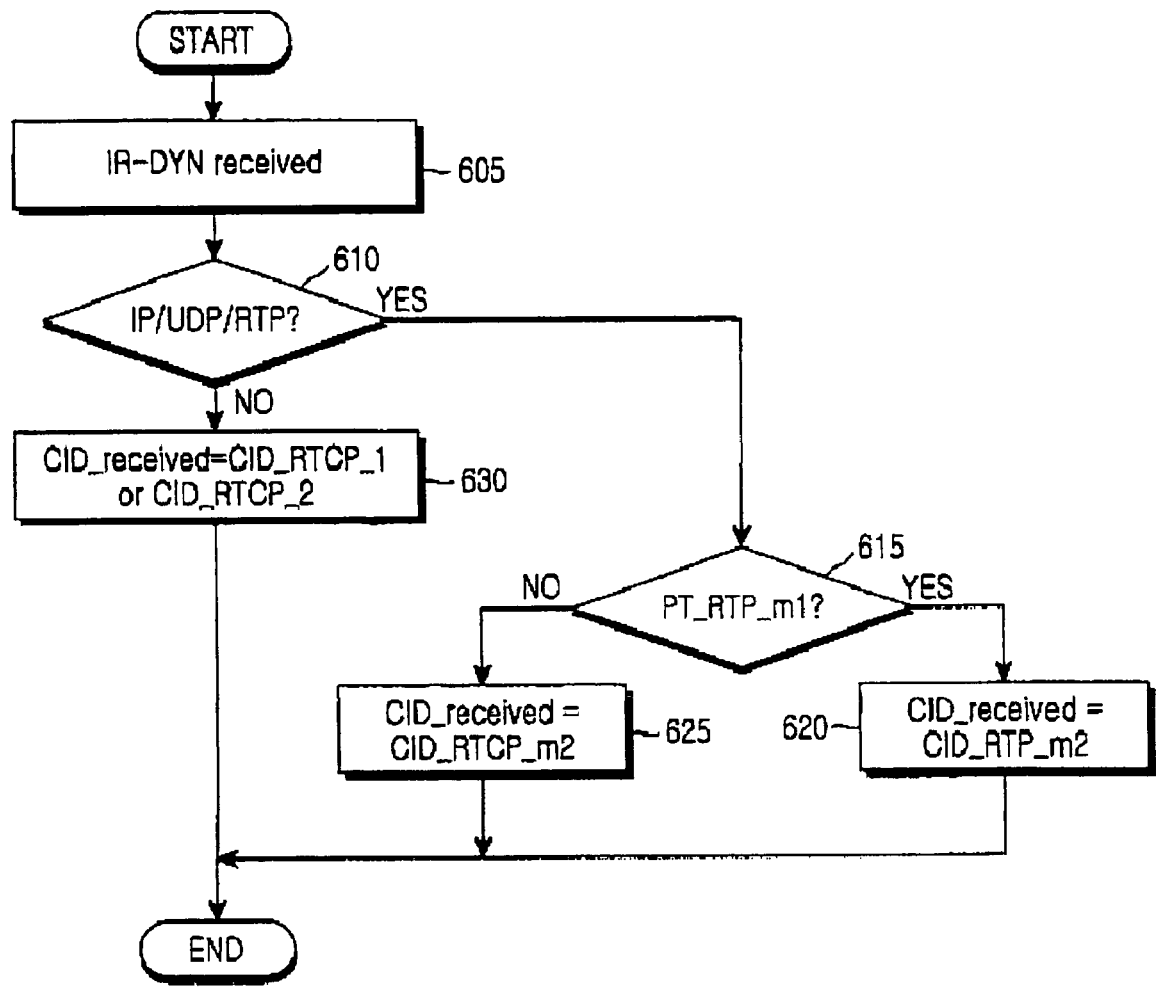

FIG. 6 is a flowchart illustrating the procedure of CID correction by the PDCP entity when one PDCP entity processes two media and two RTCP streams according to a preferred embodiment of the present invention.

Herein, the UE includes contexts for the RTP media streams and contexts for the RTCP streams for the new PDCP entity. The new PDCP entity processes the media m1 and m2, and contexts for the RTP and RTCP streams may exist for each of the media m1 and m2. Thus, the new PDCP entity receives information related to four contexts of the old PDCP entity. The new PDCP entity stores the RTP context of the media m1 as RT_RTP_m1 and the RTP context of the media m2 as RT_RTP_m2.

Referring to FIG. 6, the UE receives the IR-DYN packet with a predetermined CID (step 605). The IR-DYN packet includes a CID, a profile and a dynamic part. If the IR-DYN packet relates to the RTP, the dynamic part includes the PT value.

In step 610, the UE inspects the profile of the IR-DYN packet. If the profile value is 0 or 2, the IR-DYN packet relates to the RTCP media stream and step 630 is performed. If the profile value is 1, the IR-DYN packet relates to the RTP stream and that step 615 is performed.

In step 615, the UE inspects the PT (PT_received) of the IR-DYN packet. If the PT (PT_received) of the IR-DYN packet is identical to the PT (PT_RTP_m1) of the RTP context of the media m1, step 625 is performed. Otherwise, step 620 is performed. In step 620, the UE replaces the CID (CID_RTP_m2) of the RTP context of the media m2 with the CID (CID_received) of the IR-DYN packet. After that, the UE updates the dynamic part of the RTP context of the media m2 by using the dynamic part of the IR-DYN packet and resumes header decompression the updated context.

In step 625, the UE replaces the CID (CID_RTP_m1) of the RTP context of the media m1 with the CID (CID_received) of the IR-DYN packet. After that, the UE updates the dynamic part of the RTP context of the media m1 by using the dynamic part of the IR-DYN packet and resumes header decompression with the updated context.

In step 630, the PCDP entity matches the CID (CID_received) of the IR-DYN packet with a proper context. Since the IR-DYN packet for the RTCP stream does not include the PT, it becomes very complicated to match the RTCP streams with proper media streams.

The UE checks whether the profile of the IR-DYN packet is 0 or 2. If the profile of the IR-DYN packet is 0, it means that the header compression is not employed. Thus, the UE determines the RTCP stream which matches with the ID-DYN packet by using the UDP port number.

If the profile of the IR-DYN packet is 2, it means that header compression was used in the UDP/ID header, so the RTCP stream cannot be matched with the CID by using the IR-DYN packet only. So the UE defers CID correction for the RTCP stream until the IR packet is received. When the IR packet is received, the UE performs CID correction based on the UDP port number in the IR packet by searching the context for the RTCP stream with a matching UDP port number, and sets the CID of the context of the RTCP stream as the CID of the IR packet.

Figure 7:
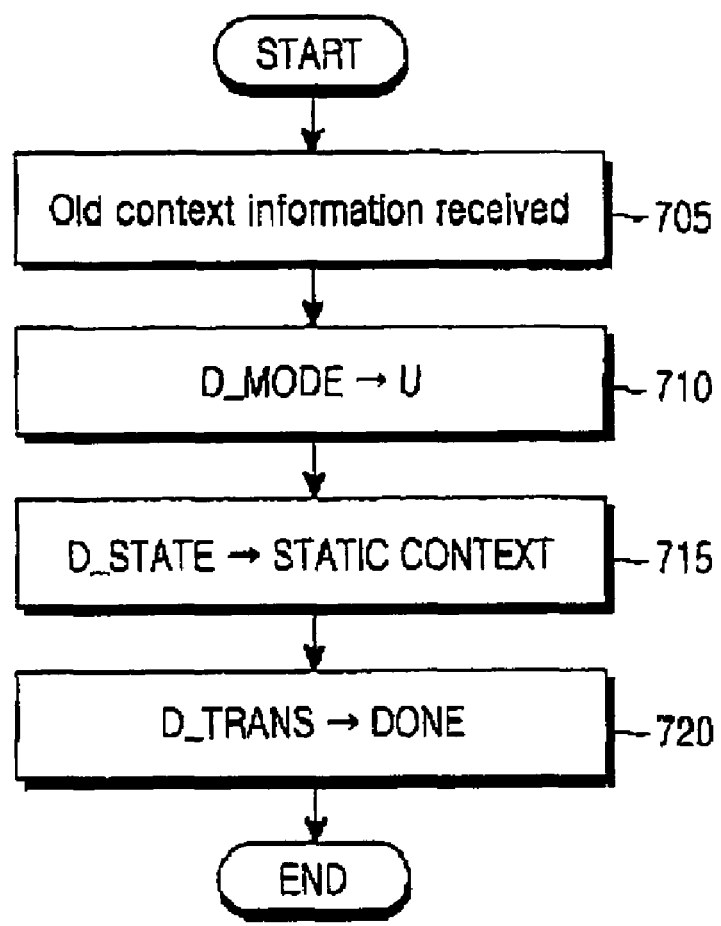
FIG. 7 is a flowchart illustrating a procedure of setting operating parameters according to an embodiment of the present invention.

FIG. 7 is a flowchart illustrating a procedure of setting operating parameters according to an embodiment of the present invention.

Referring to FIG. 7, the UE provides the new PDCP entity with the operating parameters of the old context information from the old PDCP entity (step 705). The operating parameters include D_MODE, D_STATE, D_TRANS, and parameters required for decompressing the RTP time stamp. D_MODE represents the present mode of the header decompressor, D_STATE represents the present state of the context, and D_TRANS represents whether the header decompressor mode is being switched. Since the parameters required for decompressing the RTP time stamp have static values, the parameter values used in the old PDCP entity are reused.

In step 710, if the D_MODE of the old context is not "U", the UE sets the D_MODE of the old context information as "U". As mentioned above, D_MODE represents the present mode of the header decompressor and may includes "U" signifying a unidirectional mode, "O" signifying an optimistic mode, and "R" signifying a reliable mode of transmission.

In step 715, the UE sets the D_STATE of the old context information to "STATIC CONTEXT". D_STATE represents the present state of the context and includes "NO CONTEXT", "STATIC CONTEXT" and "FULL CONTEXT". "NO CONTEXT" indicates that context does not exist, so the header decompression operation cannot be executed until the UE receives the IR packet. "STATIC CONTEXT" indicates that only static part of the context may exist, so the header decompression can be executed by updating the dynamic part by receiving the IR-DYN packet, etc. In addition, "FULL CONTEXT" indicates that all the context information may exist, so that header decompression can be executed instantly. According to a preferred embodiment of the present invention, the header decompressor resumes header decompression after receiving the IR-DYN packet, so D_STATE is set to STATIC CONTEXT.

In step 720, the UE sets D_TRANS of the old context information to DONE. D_TRANS is a parameter representing whether the header decompressor mode is being switched. If the header decompressor mode is being switched, D_TRANS is set as "PENDING". Otherwise, D_TRANS is set to DONE. Since the new PDP entity may operate in the unidirectional mode, D_MODE of the new PDCP entity is set to DOEN.

The above description applies to a method for establishing the new PDCP entity by using old PDCP entity context. According to alternative embodiment of the present invention, the new PDCP entity for the MBMS can be established by pre-configuration information to simplify establishing a connection with a new PDCP entity. To do so, a plurality of RNCs establish the PDCP entity and the header compressor by using the same pre-configuration information. Thus, the RNCs may use substantially the same PDCP entity so that cells providing the MBMS transmit data that was generated based on the same PDCP entity.

In accordance with this alternative embodiment, the RNCs establish the PDCP entities for the MBMS by using the same pre-configuration information. Thus, the RNCs have substantially the same PDCP entities, header compressors and header compression contexts. If the MBMS includes a plurality of media streams, the header compression contexts of the RNCs may each have the same CID or the media streams.

FIG. 8 is a view illustrating configuration information of a predetermined PDCP according to an embodiment of the present invention for establishing the PDCP entities in the RNCs for the UEs to establish the corresponding PDCP entities.

Referring to FIG. 8, a "PDCP PDU header" 802 represents existence or absence of the PDCP header. Since the PDCP header is not an essential part in the header compression operation, it can be omitted. Header compression information 804 includes a CID inclusion info 806, a maximum CID (MAX_CID) 808, and a reverse decompression depth 810. The CID inclusion info 806 indicates whether the CID value is included in the ROHC packet or the PDCP header. In FIG. 8, the CID is included in the ROHC packet. The maximum CID (MAX_CID) 808 represents the maximum CID value for the header compressor/decompressor. Herein, the maximum value of the CID is 15. The reverse decompression depth 810 is a parameter indicating storage capacity of the packets that fail to decompress the headers. In FIG. 8, the reverse decompression depth 810 is assumed to be "0", which means that packets failing to decompress the headers may be instantly discarded.

To discriminate the same header compression contexts having a plurality of RNCs, the RNCs allocate the CIDs to the header compression contexts according to the following predetermined order. Herein, one header compressor/decompressor may perform the header compression/decompression operation for n media.

CID 0 is allocated to a stream of the RTP media using the lowest UDP port number.

CID 1 is allocated to the RTCP stream of the RTP media having CID 0.

CID 2 is allocated to a stream of the RTP media using the second lowest UDP port number.

CID 3 is allocated to the RTCP stream of the RTP media having CID 2.

CID $(x-1)*2$ is allocated to a stream of the RTP media using the $x^{th}$ lowest UDP port number.

CID $(x-1)*2-1$ is allocated to a RTCP stream of the RTP media having the CID $(x-1)*2$.

Such a system may determine the CIDs in advance for the media streams that are compressed/decompressed by the specific PDCP entity and the RTCP streams of the corresponding media. Therefore, the UE can resume the header decompression by using the old CID without correcting the old CID even when the new PDCP entity is established.

In other words, the configuration of the PDCP entity and the header compressor/decompressor is determined in advance, simplifying the operation of the UE in reestablishing the PDCP entity and header decompressor when the UE moves between cells and the channel type is switched.

Figure 9:
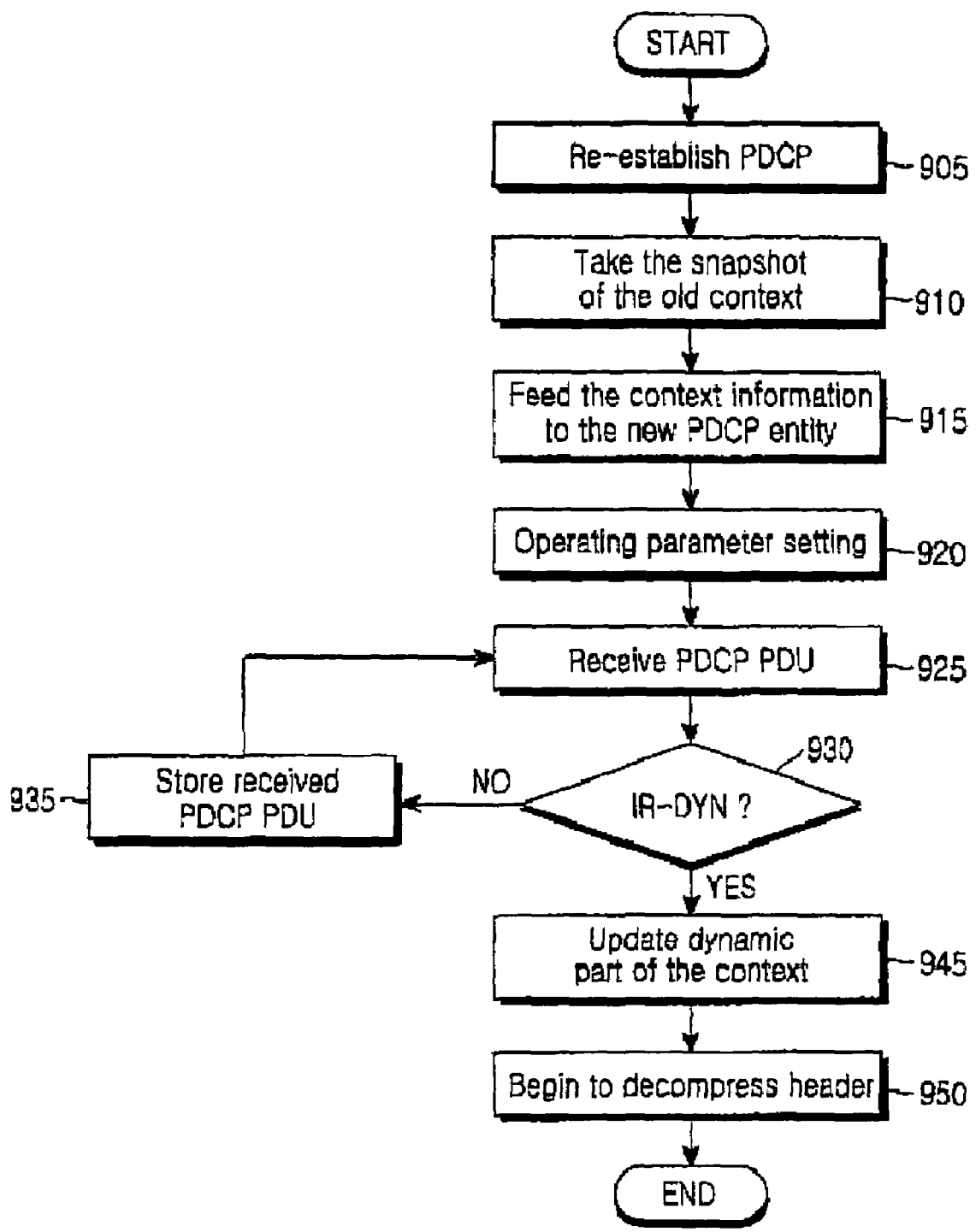
FIG. 9 is a flowchart illustrating a procedure of resuming an MBMS for a user equipment moving between cells according to a further alternative embodiment of the present invention.

FIG. 9 is a flowchart illustrating a procedure of resuming the MBMS for the UE moving between cells according to an alternative embodiment of the present invention.

Referring to FIG. 9, the UE determines if reestablishment is necessary (step 905). Herein, the UE can determine the reestablishment of header compression based on various factors as follows. For instance, when the UE detects a new cell with a different PDCP entity or when the channel type of the MBMS is switched. In step 910, the UE stores the old context information used in the header decompressor of the old PDCP entity. Later on, the old PDCP and the old header decompressor are discarded.

In step 915, the UE establishes the new PDCP entity and feeds the old context information (decompression_context_x_old) to the new PDCP entity and header decompressor. In step 920, as descried above with reference to FIG. 7, the UE sets the operating parameters of the old context information (decompression_context_x_old) with proper values.

In step 925, the UE receives packet data from the new PDCP entity through the RLC layer. The packet data are PDCP PDU transferred to the PDCP layer of the UE from the RLC layer of the UE. In step 930, the UE checks whether the PDCP PDU is the IR-DYN packet. If the PDCP PDU is the IR-DYN packet, step 945 is performed. Otherwise, step 935 is performed and the UE stores the PDCP PDU and returns to step 925. That is, the PDCP PDUs received while waiting for the IR-DYN packet, are stored in the UE for the decompression. At this time, the UE can discard the PDCP PDUs, if they are not necessary.

In step 945, the UE updates the dynamic part of the old context information (decompression_context_x_old) by using the IR-DYN packet, thereby forming the new context (decompression_context_x_new). At this time, the CID of the old context information does not have to be corrected. This is because the CID of the old compression context used in the old cell is identical to the CID of the compression context used in the new cell. Accordingly, in step 950, the UE resumes header decompression with the new PDCP entity and the new context (decompression_context_x_new). At this time, if the UE has PDCP PDUs stored for decompression, the PDCP PDUs are decompressed according to the new context (decompression_context_x_new).

Figure 10:
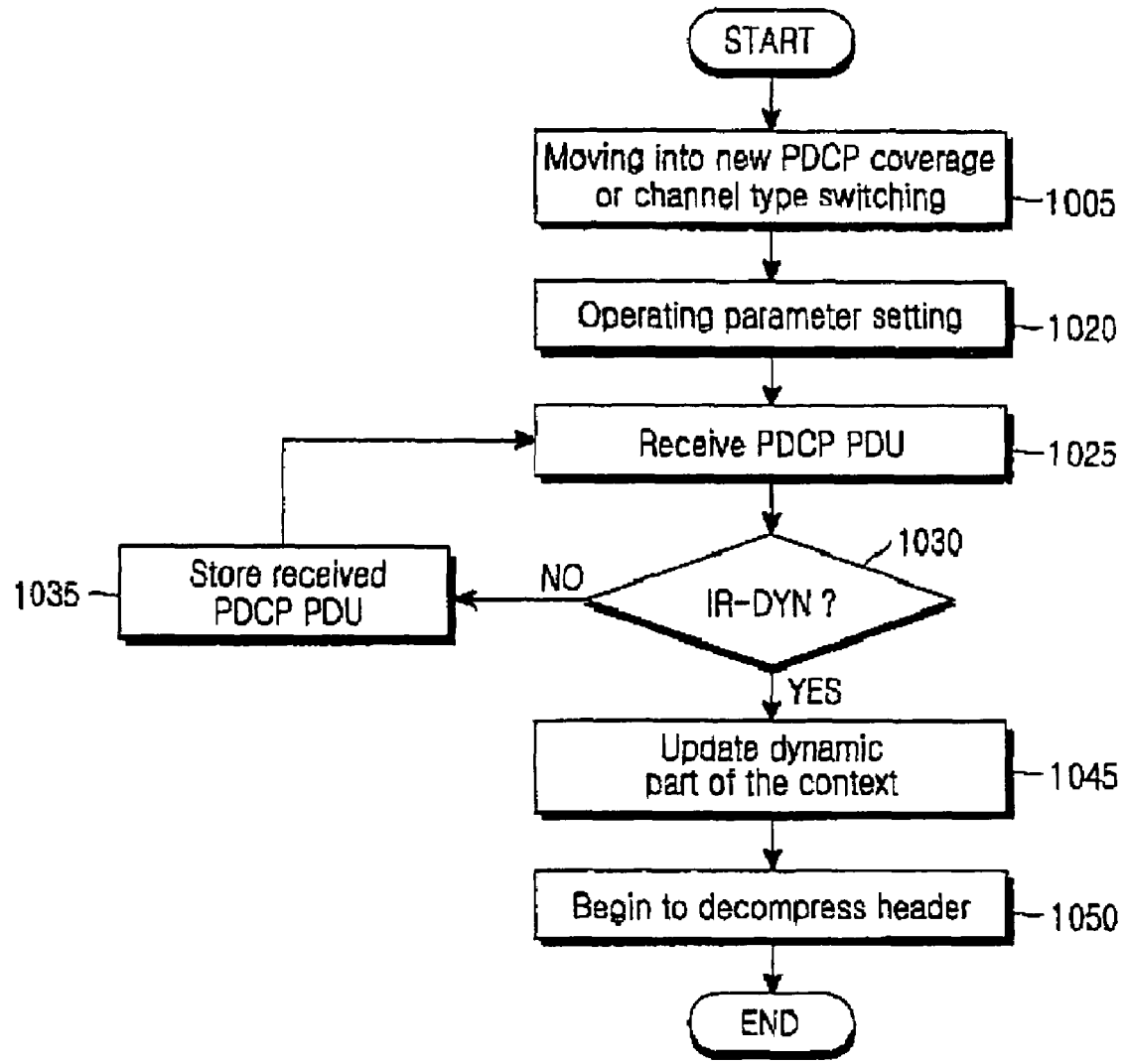
FIG. 10 is a flowchart illustrating a procedure of reusing an old PDCP entity in a user equipment according to yet another embodiment of the present invention.

As described above, if the pre-configuration information for the PDCP entity and the header compressor/decompressor is used, the old PDCP entity can be reused without reestablishing the PDCP entity even if the UE moves between cells or the channel type is switched. FIG. 10 is a flowchart illustrating a procedure of reusing the old PDCP entity in the UE according to a further alternative embodiment of the present invention.

Referring to FIG. 10, in step 1005, the UE determines if reestablishment of header compression is necessary when the UE moves into a new cell or the channel type is switched. In step 1020, as descried above with reference to FIG. 7, the UE sets the operating parameters of the old context used in the old PDCP entity with proper values. That is, D_MODE is set to U, D_STATE is set to STATIC CONTEXT, and D_TRANS is set to DONE.

In step 1025, the UE receives the PDCP PDU from the new cell through the lower layer. In step 1030, the UE checks whether the PDCP PDU is the IR-DYN packet. If the PDCP PDU is the IR-DYN packet, step 1045 is carried out. Otherwise, step 1035 is performed and the UE stores or discards the PDCP PDU and returns to step 1025.

In step 1045, the PDCP entity updates the dynamic part of the above context by using the IR-DYN packet. When the operating parameters have been reestablished and the dynamic part has been updated, the UE resumes the header decompression with the updated context (step 1050).

The present invention having the above construction and operation has the following representative advantages.

The UE establishes a new PDCP entity while reestablishing the radio bearer so as to transfer the old context information to the new PDCP entity. Since the new PDCP entity utilizes the old context information through the operating parameter establishment/CID correction/dynamic part update, an initializing procedure is not necessary. Thus, the present invention can rapidly resume header decompression when establishing a new PDCP entity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of resuming a header decompression operation by means of a user equipment (UE) in a communication system capable of providing a multimedia broadcast/multicast service (MBMS), the method comprising the steps of:
   detecting movement of the UE receiving the MBMS into a new cell from an old cell;
   copying and storing old header decompression context information used in the old cell;
   initializing a dynamic part to decompress headers of packet data for the MBMS and waiting for an Initialization and Refresh Dynamic (IR-DYN) packet until the IR-DYN packet has been received in the UE, in order to update the old header decompression information;
   creating a new header decompression context through updating the old header decompression information by using the IR-DYN packet when the IR-DYN packet has been received in the UE; and
   decompressing the headers of the packet data for the MBMS transmitted from the new cell by using the new header decompression context.

2. The method as claimed in claim 1, wherein, if other packet data for the MBMS have been received in the UE before the IR-DYN packet has been received in the UE, the other packet data are stored in such a manner that headers of the other packet data are decompressed after the new header decompression context has been created.

3. The method as claimed in claim 1, wherein, when the UE is moved into the new cell, it is determined whether the new cell employs a header decompressor and a header compression context different from those of the old cell, and a new header decompressor and a new header compression context for the new cell are established.

4. The method as claimed in claim 1, wherein, when creating the new header decompression context, a context ID of the old header decompression context information is replaced with a context ID of the IR-DYN packet.

5. The method as claimed in claim 4, wherein, when creating the new header decompression context, it is determined whether the IR-DYN packet matches the old header decompression context information according to profile information contained in the IR-DYN packet, and the context ID of the old header decompression context information is replaced with the context ID of the IR-DYN packet if the IR-DYN packet matches the old header decompression context information.

6. The method as claimed in claim 4, wherein, when creating the new header decompression context, it is determined whether the IR-DYN packet matches the old header decompression context information according to a payload type and profile information contained in the IR-DYN packet, and the context ID of the old header decompression context information is replaced with the context ID of the IR-DYN packet if the IR-DYN packet matches the old header decompression context information.

7. The method as claimed in claim 4, wherein, when creating the new header decompression context, the dynamic part of the old header decompression context information is replaced with dynamic header fields included in the IR-DYN packet.

8. The method as claimed in claim 1, further comprising a step of setting values of operating parameters of the old header decompression context information with predetermined values.

9. The method as claimed in claim 8, wherein the step of setting the values of the operating parameters. includes the substeps of setting a value of the operating parameter representing an operational mode of a new header decompressor to a value representing a unidirectional mode, setting a value of the operating parameter representing a state of the new header decompression context to a value representing that an update of the dynamic part is necessary, and setting a value of the operating parameter representing a mode switch state of the new header decompressor to a value representing that the mode of the new header decompressor is not being switched.

10. A method of resuming a header decompression operation by means of a user equipment (UE) in a communication system capable of providing a multimedia broadcast/multicast service (MBMS), the method comprising the steps of:
    preparing a plurality of header compressors and a plurality of header compression contexts, which are substantially identical to each other, in a plurality of cells according to pre-configuration information used for the MBMS;
    detecting movement of the UE receiving the MBMS into a new cell from an old cell;
    establishing a new header decompressor for decompressing packet data having compressed headers transmitted from the new cell;
    copying and storing old header decompression context information, which is used in the old cell and includes a context ID, a static part, a dynamic part and operating parameters;
    setting values of the operating parameters of the old header decompression context information with predetermined values;
    initializing the dynamic part to decompress headers of packet data for the MBMS and waiting for an Initialization and Refresh Dynamic (IR-DYN) packet until the IR-DYN packet has been received in the UE, in order to update the old header decompression information;
    creating a new header decompression context through updating the old header decompression information by using the IR-DYN packet when the IR-DYN packet has been received in the UE; and
    decompressing the headers of the packet data for the MBMS transmitted from the new cell by using the new header decompression context.

11. The method as claimed in claim 10, wherein, if other packet data for the MBMS have been received in the UE before the IR-DYN packet has been received in the UE, the other packet data are stored in such a manner that headers of the other packet data are decompressed after the new header decompression context has been created.

12. The method as claimed in claim 10, wherein the step of setting the values of the operating parameters includes the substeps of setting a value of the operating parameter representing an operational mode of the new header decompressor to a value representing a unidirectional mode, setting a value of the operating parameter representing a state of the new header decompression context to a value representing that an update of the dynamic part is necessary, and setting a value of the operating parameter representing a mode switch state of the new header decompressor to a value representing that the mode of the new header decompressor is not being switched.

13. The method as claimed in claim 10, wherein the reconfiguration information includes context ID (CID) inclusion information representing a format of a packet including the context ID, a maximum context ID representing a maximum value of the context ID, and a reverse decompression depth representing storage capacity of packets which fail to decompress the headers.

14. The method as claimed in claim 10, wherein, when the MBMS includes a plurality of real time transport protocol (RTP) streams and a plurality of RTP control protocol (RTCP) streams, the step of preparing header compressors and header compression contexts in cells includes the substeps of allocating CID (x−1)*2 to one header compression context of RTP media streams using an $x^{th}$ user data protocol (UDP) port number, and allocating CID (x−1)*2−1 to the header compression context of the RTCP stream corresponding to an RTP media having CID (x−1)*2.

* * * * *